US012609643B2

(12) United States Patent
Reith et al.

(10) Patent No.: US 12,609,643 B2
(45) Date of Patent: Apr. 21, 2026

(54) ESTIMATION OF THE TORQUE OF AN ELECTRIC MACHINE

(71) Applicant: Schaeffler Technologies AG & Co. KG, Herzogenaurach (DE)

(72) Inventors: Jochen Reith, Buhl (DE); Jiufang Peng, Karlsruhe (DE); Jurgen Eich, Buhl (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 131 days.

(21) Appl. No.: 18/574,399

(22) PCT Filed: Jun. 2, 2022

(86) PCT No.: PCT/DE2022/100412
§ 371 (c)(1),
(2) Date: Dec. 27, 2023

(87) PCT Pub. No.: WO2023/274443
PCT Pub. Date: Jan. 5, 2023

(65) Prior Publication Data
US 2024/0243679 A1 Jul. 18, 2024

(30) Foreign Application Priority Data

Jul. 1, 2021 (DE) .......................... 102021116963.1

(51) Int. Cl.
*H02P 23/14* (2006.01)
*H02P 21/14* (2016.01)
(Continued)

(52) U.S. Cl.
CPC ............ *H02P 21/20* (2016.02); *H02P 21/141* (2013.01); *H02P 27/06* (2013.01)

(58) Field of Classification Search
CPC ...... B60L 15/20; B60L 50/15; B60L 2260/44; H02P 21/141; H02P 21/20; H02P 23/14; H02P 27/06; H02P 2207/05
(Continued)

(56) References Cited

U.S. PATENT DOCUMENTS 6,958,587 B1 * 10/2005 Naik ........................ H02P 5/747
318/52
2019/0092188 A1 * 3/2019 Plianos ............... B60L 15/2009
(Continued)

FOREIGN PATENT DOCUMENTS

DE 102008001714 A1 11/2009
DE 102011075387 A1 11/2012
(Continued)

*Primary Examiner* — Gabriel Agared
(74) *Attorney, Agent, or Firm* — Volpe Koenig

(57) ABSTRACT

The present disclosure relates to a method for estimating a torque of an electric machine, comprising the following steps: estimating a first torque using a first method by forming a cross product from an estimated magnetic flux of the electric machine and an actual current of the electric machine, estimating a second torque using a second method by determining a power balance which can be calculated with the aid of a difference between an AC output power of an inverter, which is connected to the electric machine, and a total power loss of the electric machine, and determining the final torque as a weighted average from the first torque, which is weighted with a first weighting, and the second torque, which is weighted with a second weighting. The present disclosure also relates to a control unit for carrying out this method and to an electrical traction drive having such a control unit.

15 Claims, 1 Drawing Sheet

(51) Int. Cl.
  *H02P 21/20*          (2016.01)
  *H02P 27/06*          (2006.01)
(58) Field of Classification Search
  USPC ......................................................... 318/432
  See application file for complete search history.

(56)                    References Cited

U.S. PATENT DOCUMENTS

| | | | | |
|---|---|---|---|---|
| 2020/0076326 A1* | 3/2020 | Liu | .......................... | H02P 27/06 |
| 2022/0024442 A1* | 1/2022 | Ball | ...................... | B60W 20/50 |
| 2022/0329190 A1* | 10/2022 | Fukumura | ............... | H02P 21/20 |

FOREIGN PATENT DOCUMENTS

| | | | | |
|---|---|---|---|---|
| DE | 102018103831 A1 | 6/2019 | | |
| EP | 1322032 A1 | 6/2003 | | |
| WO | 14084009 A1 | 6/2014 | | |
| WO | WO-2021054033 A1 * | 3/2021 | .............. | H02P 29/66 |

* cited by examiner

ESTIMATION OF THE TORQUE OF AN ELECTRIC MACHINE

CROSS-REFERENCE TO RELATED APPLICATIONS

This application is the U.S. National Phase of PCT Appln. No. PCT/DE2022/100412, filed Jun. 2, 2022, which claims the benefit of German Patent Appln. No. 102021116963.1, filed Jul. 1, 2021, the entire disclosures of which are incorporated by reference herein.

TECHNICAL FIELD

The present disclosure relates to a method for estimating the torque of an electric machine, in particular an electric motor and in particular a permanent magnet synchronous machine (PMSM). The present disclosure further relates to a control unit that is configured and designed to carry out such a method, as well as an electric traction drive with such a control unit.

BACKGROUND

To control electric machines, the most precise possible knowledge of the machine parameters is required. One important parameter here is torque. However, exactly determining torque using sensors is time-consuming and expensive. As a rule, the requirements for the accuracy of determining the torque of electric traction machines are very high. This applies in particular to determining the torque of electric machines that serve as a drive source in an automobile or vehicle, such as in electric vehicles or a hybrid vehicle. For reasons of driving comfort, homologation (registration of a motor vehicle depending on country-specific requirements) and an efficient combustion engine load point shift in hybrid drives, it is necessary to estimate the torque as accurately as possible. Such high accuracy requirements as well as the fundamentally narrow tolerance limits for manufacturing and aging of the electric machine usually lead to high costs for the measuring sensors.

Methods for estimating the torque of an electric machine are therefore known from the prior art. The goal is to estimate the torque as accurately as possible for the reasons mentioned above.

One possible method for torque estimation is to determine the torque of the electric machine according to a first method (hereinafter referred to as first torque) by forming the cross product of an estimated magnetic flux and the phase currents of the electric machine. This method is known, for example, from WO 14084009 A1 and from DE 10 2018 103 831 A1.

WO 14084009 A1 refers to a control device for an electric motor. The control device, on the one hand, is capable of operating a PMSM with high efficiency and, on the other hand, is capable of setting an output torque with high accuracy. This is possible even when the PMSM is running at a low speed.

DE 10 2018 103 831 A1 relates to a method and a device for adaptive rotor-oriented control and torque estimation of a PMSM based on estimates of the magnetic flux in the steady state. The method disclosed herein is used to operate a control device for an electric machine, the control device regulating at least one actual current in the electric machine at different operating points of the electric machine. At least one magnetic flux is automatically estimated during operation of the electric machine and stored in at least one adaptive flux map. The adaptive flux map stores magnetic fluxes assigned to an operating point of the electric machine.

This publication also discloses a method in which the magnetic flux is automatically estimated during operation of the electric machine and a torque can be determined based on the estimated magnetic flux. The mathematical relationship for calculating the first torque from the estimated magnetic flux and the actual current of the electric machine is described in DE 10 2018 103 831 A1 with the following formula (1):

$$a.\ M1 = \frac{3}{2} \times p \times \begin{pmatrix} \psi_d \\ \psi_q \end{pmatrix} \times \begin{pmatrix} I_d \\ I_q \end{pmatrix} \tag{1}$$

This equation can be used to determine the first torque of a permanent magnet synchronous machine (PMSM) with a rotor-fixed d-q coordinate system. M1 is the first torque, p is the number of pole pairs of the electric machine, $\Psi_d$ and $\Psi_q$ the magnetic flux in the d direction and in the q direction respectively, and $I_d$ and $I_q$ the actual current in the d direction and the q direction respectively.

Furthermore, when calculating the first torque using formula (1), part of the power loss of the electric machine can also be taken into account. The power loss of an electric machine is the proportion of the power supplied to the electric machine that is undesirably converted into heat flow and therefore cannot be converted into torque for the electric machine. The losses of a permanent magnet-excited synchronous machine consist of electromagnetic and mechanical losses. The electromagnetic losses caused by current or magnetic flux occur as current heat/copper, iron and magnetic losses. The rotation of the rotor generates mechanical losses, which manifest themselves as bearing and ventilation losses.

When calculating the first torque, iron losses (referred to in the following formula (2) as $P_{FEloss}$) and mechanical losses (referred to in the following formula (2) as $P_{mech.loss}$) are taken into account. For this purpose, the respective power losses are set in relation to a speed-based angular velocity $\omega$ of the electric machine. This results in the following formula (2) for determining the first torque, taking into account the power loss of the electric machine:

$$1.\ M1 = \frac{3}{2} \times p \times \begin{pmatrix} \psi_d \\ \psi_q \end{pmatrix} \times \begin{pmatrix} I_d \\ I_q \end{pmatrix} - \frac{P_{FEloss}}{\omega} - \frac{P_{mech.loss}}{\omega} \tag{2}$$

The speed-based angular velocity $\omega$ of the electric machine can be determined from the mechanical speed of the electric machine n according to formula (3) as follows:

$$1.\ \omega = \frac{2 \times \pi \times n}{60} \tag{3}$$

In other words, in the first method, the magnetic flux links of the electric machine are estimated and the phase currents of the electric machine are determined. With the aid of the angle between these two variables, the torque of the electric motor can then be estimated. Iron losses and mechanical losses may optionally also be taken into account.

However, using the first method for torque estimation has the limitation that this method is inaccurate at high speeds. This can be justified, among other things, by the fact that the inaccuracies in the rotor angle when transforming the phase currents into the rotor-fixed coordinate system lead to larger torque deviations in the upper speed range than in the basic setting range at low speeds due to the necessary field weakening.

Furthermore, a second method for estimating the torque of an electric machine (hereinafter referred to as second torque) is known from the prior art. In this second method, a power balance of the electric machine is determined. To determine the power balance, the difference is formed between the drive power supplied to the electric machine and the total power loss of the electric machine. The drive power supplied to the electric machine corresponds to an alternating current output power of an inverter. The inverter supplies the electric machine with (alternating) voltage.

The ratio of the difference in the drive power $P_A$ supplied to the electric machine and the total power loss $P_{tot.loss}$ of the electric machine to the speed-based angular velocity $\omega$ of the electric machine then gives rise to the second torque M2, see the following formula (4):

$$a.\ M2 = \frac{P_A - P_{tot.loss}}{\omega} \tag{4}$$

In other words, in the second method, which is used less frequently in practice than the first method, the losses of the electric machine are subtracted from the AC output power of the inverter and the result is divided by the angular velocity. Mechanical losses can additionally be taken into account here.

However, this second method has the disadvantage of being inaccurate at low speeds, since in this case the AC output power of the inverter has little influence on torque. In other words, the second method is relatively inaccurate at low speeds because the AC output power carries little information. At low speeds, the AC output power of the inverter is mainly dominated by the losses of the electric machine and is hardly influenced by the low mechanical output power.

Alternatively or in addition to the first and second methods, the torque of an electric machine can be estimated through the use of observers. Observers are used to simulate state variables of technical systems that either cannot be measured at all or can only be measured with great technical effort, such as torque in this case. These observers allow torque estimation from available variables, such as the current or voltage of the electric machine, which are based on the mechanical rotational movement of the electric machine.

However, since some influencing variables are not known or are inaccurate when estimating torque using an observer, this method for estimating torque does not meet the usual accuracy requirements.

SUMMARY

The present disclosure is intended to reduce or eliminate this problem from the previously known methods. The aim is to enable accurate torque estimation at both high and low speeds. In particular, it is the object of the present disclosure either to increase accuracy in estimating the torque of an electric machine with a constant drive hardware or to reduce costs for sensors and hardware with a constant torque estimation accuracy.

This object is achieved by the present method with the aspects according to claim 1, by a control unit for carrying out this method according to claim 9 and by an electric traction drive with such a control unit according to claim 10.

The method according to the present disclosure is used to estimate a torque of an electric machine, in particular a permanent magnet-excited synchronous machine, with the following steps:

estimating a first torque using a first method by forming a cross product from an estimated magnetic flux of the electric machine and an actual current of the electric machine, estimating a second torque using a second method by determining a power balance which can be calculated with the aid of a difference between an AC output power of an inverter, which is connected, in particular electrically, to the electric machine, and a total power loss of the electric machine, and determining the final torque as a weighted average of the first torque, which is weighted with a first weighting, and the second torque, which is weighted with a second weighting.

This results in the following formula (5) for determining the final torque M_fin:

$$a.\ M_{fin} = \frac{w1 \times M1 + w2 \times M2}{w1 + w2} \tag{5}$$

M1 is the first torque, M2 is the second torque, w1 is the first weighting and w2 is the second weighting.

By fusing the first and second methods with one another, the torque of the electric machine can be estimated with increased accuracy, with higher robustness, i.e., with less susceptibility to errors, or optionally with reduced costs. In the method according to the disclosure, two state estimates are combined with one another and their values are thus smoothed, such that the result can be a more accurate torque estimate, compared to the case in which only the first or the second method is used.

Advantageous exemplary embodiments are claimed in the dependent claims and are explained in greater detail below.

Alternatively, it is preferred for the first weighting to be the reciprocal of a first variance of a first parameter that represents the first torque, and the second weighting to be the reciprocal of a second variance of a second parameter that represents the second torque.

This means that the first and second weightings w1 and w2 can be represented with the aid of the following formulas (6) and (7), respectively:

$$i.\ w1 = \frac{1}{Var1} \tag{6}$$

$$ii.\ w2 = \frac{1}{Var2} \tag{7}$$

Var1 and Var2 are the variances of the first and second parameters, respectively.

The reciprocals of the variances therefore serve as a quality indicator for weighting. Determining a weighting as the reciprocal of the variance is known as a Fraser-Potter-Smoother from D.C. Fraser and J. E. Potter, "The Optimum Linear Smoother as a Combination of Two Optimum Linear Filters", IEEE Transactions on Automotive Control, vol. AC-14, no. 4, pp. 387-390, August, 1969.

If the first and second weightings are determined in this way, a particularly accurate result for the final torque can be obtained, i.e., optimal fusion can take place.

It is desirable for the first parameter and the second parameter each to be a variable selected from a speed of the electric machine, an intermediate circuit voltage of an intermediate circuit that is connected, in particular electrically, to the electric machine, or a torque of the electric machine. The variances can therefore be determined depending on all of the variables listed above.

However, for successful calculation of the final torque, it is advantageous for the first and second parameters to be the same variable. For example, if the first parameter is the speed of the electric machine, then the second parameter is also the speed of the electric machine.

In a preferred embodiment of the present method, the ratio of the first weighting to the sum of the first and the second weighting is defined as a fusion factor, such that the final torque in step c) of the method can be determined exclusively from the first torque, the second torque and the fusion factor.

The fusion factor can therefore be determined from the following formula (8):

$$i.\ f = \frac{w1}{w1 + w2} \tag{8}$$

Using the fusion factor makes it easier to mathematically represent the final torque. The final torque can be determined using the fusion factor as an alternative to formula (5) from the following formula (9):

$$a.\ M_{fin} = f \times M1 + (1 - f) \times M2 \tag{9}$$

It is advantageous for the first and second weightings each to be determined either model-based using current actual values or map-based using map data stored in a memory.

If the first and second weightings are determined using current actual values, a very accurate result can be achieved depending on the situation. If the first and second weightings are determined using map data that has already been stored, significantly less data needs to be recorded compared to determining them from actual values. Using the map data method, the remaining values can be determined by way of numerical, especially statistical, evaluation and calculation methods.

In an advantageous embodiment, iron losses and mechanical losses of the electric machine are taken into account when estimating the first torque.

By taking the losses of the electric machine into account, the torque of the electric machine can be estimated much more accurately.

More precisely, the first torque is obtained as the product of the number of pole pairs of the electric machine with the cross product of the estimated magnetic flux and the actual current of the electric machine and with a factor, the ratio of an iron power loss of the electric machine to a speed-based angular velocity of the electric machine and the ratio of the mechanical power loss of the electric machine to the speed-based angular velocity of the electric machine each being subtracted from this product.

Accordingly, the first torque can be calculated with the aid of formula (2).

Furthermore, the second torque can advantageously be determined as the ratio of the difference between the AC output power of the inverter and a total power loss of the electric machine to the speed-based angular velocity of the electric machine.

Accordingly, the second torque can be estimated with the aid of formula (4).

Advantageously, in the case that the torque of the electric machine is used as the first and/or the second parameter, the result of a previously determined final torque or the first torque is used as the torque which represents the first and/or the second parameter.

The result of a previously determined final torque should only be used as the torque that represents the first and/or the second parameter if there is a sufficiently high-frequency torque estimate.

The determination of this type for the first and/or second weighting from the torque is very accurate and subsequently allows the final torque to be accurately determined.

Furthermore, the present disclosure provides a control unit for carrying out the method described above.

Such a control unit can estimate a torque of an electric machine accurately and cost-effectively by carrying out the method described above.

The present disclosure also includes an electric traction drive with such a control unit.

Thus, the torque of an electric machine, which is part of the electric traction drive, can be estimated very accurately and cost-effectively by the control unit by carrying out the method described above.

The disclosure will now be explained in more detail below with reference to figures, in which context at least one exemplary embodiment is also illustrated.

BRIEF DESCRIPTION OF THE DRAWINGS

In the figures.

The figures are merely schematic in nature and serve solely for understanding the disclosure. Identical elements are provided with the same reference symbols.

DETAILED DESCRIPTION

The method according to the disclosure is shown schematically using the figures. The torque of an electric machine 1 is estimated. For this purpose, a first torque M1 is estimated using a first method by forming a cross product from an estimated magnetic flux of the electric machine 1 and an actual current of the electric machine 1. In addition, a second torque M2 is estimated using a second method by determining a power balance that can be calculated with the aid of a difference between an AC output power of an inverter 2 connected to the electric machine 1 and a total power loss of the electric machine 1. The final torque M_fin is then determined as a weighted average or as a linear combination of the first torque M1, which is weighted with a first weighting, and the second torque M2, which is weighted with a second weighting.

Figure 1:
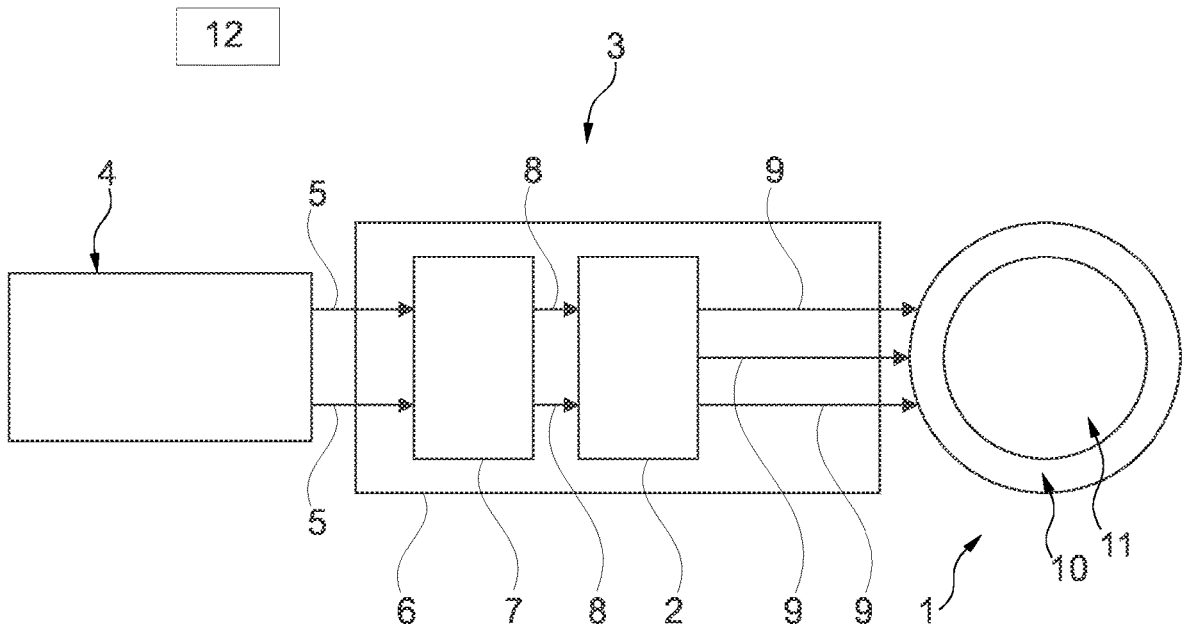
FIG. 1 shows a schematic representation of an electric traction drive.

FIG. 1 shows a schematic illustration of an electric traction drive 3. The electric traction drive 3 has a high-voltage storage device or a battery 4. This supplies a direct voltage 5 to power electronics 6. The power electronics 6 have an intermediate circuit 7 and the inverter or inverter/ converter 2. The intermediate circuit 7 is an electric device that, as an energy storage device electrically couples a plurality of electrical networks on an intermediate current or voltage level via converters. The inverter 2 converts the direct voltage 8 received from the intermediate circuit 7 into an alternating voltage 9. The alternating voltage 9 has the three phases u, v and w. This alternating voltage 9 is then supplied to the electric machine or E-machine 1. The E-machine 1 has a stator 10 and a rotor 11. The E-machine 1 takes the form of a PMSM, the rotor 11 of which has permanent magnets (not shown here). The stator 10 has coils that are magnetized by the alternating voltage 9. Due to the attraction or repulsion forces between the permanent magnets in the rotor 11 and the coil magnetic field in the stator 10, the rotor 11 rotates at a certain speed n and thus generates a torque M. The mechanical speed n of the E-machine 1 corresponds to the number the revolutions of the rotor 11 per unit of time. Furthermore, FIG. 1 shows the control unit 12, which is designed to carry out the method shown schematically in FIG. 2.

Figure 2:
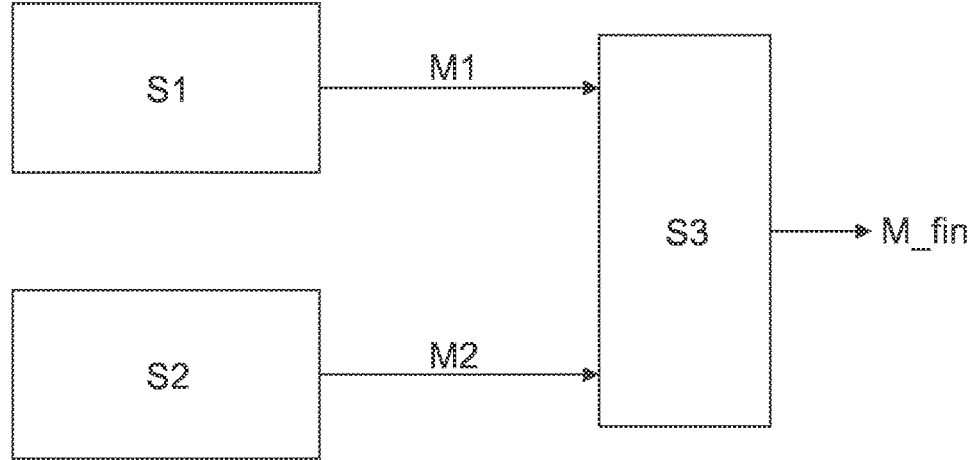
FIG. 2 shows a schematic representation illustrating the determination of the final torque of an electric machine.

FIG. 2 shows schematically the determination of the final torque M_fin of the E-machine 1. In step S1, the first method is first carried out and the first torque M1 is estimated by way of the magnetic flux-current cross product method (see formula (2)). In step S2, the second method is then carried out and the second torque M2 is estimated by way of the power balance (see formula (4)). The first torque M1 obtained from step S1 and the second torque M2 obtained from step S2 are fused in step S3 to form the final torque M_fin (see formulas (5) and (9) respectively).

LIST OF REFERENCE SYMBOLS

1 E-machine
2 Inverter
3 Intermediate circuit
4 Control unit
5 Electric traction drive
6 High-voltage terminal
7 DC voltage
8 Power electronics unit
9 DC voltage
10 AC voltage
11 Rotor
12 Stator
M1 First torque
M2 Second torque
M_fin Final torque
S1 Step for performing the first method
S2 Step for performing the second method
S3 Step for estimating final torque

The invention claimed is:

1. A method for estimating a torque of an electric machine comprising:
    a) estimating a first torque using a first method by forming a cross product from an estimated magnetic flux of the electric machine and an actual current of the electric machine,
    b) estimating a second torque using a second method by determining a power balance, using a difference between an AC output power of an inverter, which is connected to the electric machine, and a total power loss of the electric machine, and
    c) determining the final torque as a weighted average of the first torque, which is weighted with a first weighting, and the second torque, which is weighted with a second weighting;

wherein the first weighting is the reciprocal of a first variance of a first parameter that represents the first torque and the second weighting is the reciprocal of a second variance of a second parameter that represents the second torque.

2. The method for estimating a torque of the electric machine according to claim 1, wherein the first parameter and the second parameter may each be at least one of a speed of the electric machine, an intermediate circuit voltage of an intermediate circuit that is connected to the electric machine, or a torque of the electric machine.

3. The method for estimating a torque of the electric machine according to claim 1, wherein the first and second weightings are either model-based using current actual values or map-based using map data stored in a memory.

4. The method for estimating a torque of the electric machine according to claim 1, wherein iron losses and mechanical losses of the electric machine are taken into account when estimating the first torque in step a).

5. The method for estimating a torque of the electric machine according to claim 1, wherein the electric machine includes a number of pole pairs, wherein the first torque is the product of the number of pole pairs of the electric machine with the cross product of the estimated magnetic flux and the actual current of the electric machine and with a factor, wherein a ratio of an iron power loss of the electric machine to a speed-based angular velocity of the electric machine and a ratio of the mechanical power loss of the electric machine to the speed-based angular velocity of the electric machine are each subtracted from this product.

6. The method for estimating a torque of the electric machine according to claim 5, wherein the second torque can be determined as a ratio of the difference between the AC output power of the inverter and a total power loss of the electric machine to the speed-based angular velocity of the electric machine.

7. The method for estimating a torque of the electric machine according to claim 2, wherein when at least one of the first or the second parameter is the torque of the electric machine, the result of a previously determined final torque or the first torque is used as the torque which represents the at least one of the first or the second parameter.

8. A control unit for an electric machine configured to:
    a) estimate a first torque using a first method by forming a cross product from an estimated magnetic flux of the electric machine and an actual current of the electric machine,
    b) estimate a second torque using a second method by determining a power balance, using a difference between an AC output power of an inverter, which is connected to the electric machine, and a total power loss of the electric machine and
    c) determine the final torque as a weighted average of the first torque, which is weighted with a first weighting, and the second torque, which is weighted with a second weighting;
    wherein the first weighting is the reciprocal of a first variance of a first parameter that represents the first torque and the second weighting is the reciprocal of a second variance of a second parameter that represents the second torque.

9. An electric traction drive, comprising an electric machine and a control unit, wherein the control unit is configured to:

a) estimate a first torque using a first method by forming a cross product from an estimated magnetic flux of the electric machine and an actual current of the electric machine, b) estimate a second torque using a second method by determining a power balance, using a difference between an AC output power of an inverter, which is connected to the electric machine, and a total power loss of the electric machine and c) determine the final torque as a weighted average of the first torque, which is weighted with a first weighting, and the second torque, which is weighted with a second weighting;

wherein the first weighting is the reciprocal of a first variance of a first parameter that represents the first torque and the second weighting is the reciprocal of a second variance of a second parameter that represents the second torque.

10. The electric traction drive according to claim 9, wherein the first parameter and the second parameter may each be at least one of a speed of the electric machine, an intermediate circuit voltage of an intermediate circuit that is connected to the electric machine, or a torque of the electric machine.

11. The electric traction drive according to claim 9, wherein the first and second weightings are either model-based using current actual values or map-based using map data stored in a memory.

12. The electric traction drive according to claim 9, wherein iron losses and mechanical losses of the electric machine are taken into account when estimating the first torque in step a).

13. The electric traction drive according to claim 9, wherein the electric machine includes a number of pole pairs, wherein the first torque is the product of the number of pole pairs of the electric machine with the cross product of the estimated magnetic flux and the actual current of the electric machine and with a factor, wherein a ratio of an iron power loss of the electric machine to a speed-based angular velocity of the electric machine and a ratio of the mechanical power loss of the electric machine to the speed-based angular velocity of the electric machine are each subtracted from this product.

14. The electric traction drive according to claim 13, wherein the second torque can be determined as a ratio of the difference between the AC output power of the inverter and a total power loss of the electric machine to the speed-based angular velocity of the electric machine.

15. The electric traction drive according to claim 10, wherein when at least one of the first or the second parameter is the torque of the electric machine, the result of a previously determined final torque or the first torque is used as the torque which represents the at least one of the first or the second parameter.

* * * * *